(12) United States Patent
Dickes

(10) Patent No.: US 7,816,830 B2
(45) Date of Patent: Oct. 19, 2010

(54) PERMANENT MAGNET ALTERNATOR WITH SEGMENTED CONSTRUCTION

(76) Inventor: Gary Dickes, 1688 34th Ave., Kenosha, WI (US) 53144

(*) Notice: Subject to any disclaimer, the term of this patent is extended or adjusted under 35 U.S.C. 154(b) by 96 days.

(21) Appl. No.: 12/372,152

(22) Filed: Feb. 17, 2009

(65) Prior Publication Data

US 2009/0218900 A1    Sep. 3, 2009

Related U.S. Application Data

(63) Continuation of application No. PCT/US2007/018071, filed on Aug. 16, 2007.

(51) Int. Cl.
*H02K 21/12* (2006.01)
(52) U.S. Cl. .................. 310/156.12; 310/216.57
(58) Field of Classification Search .......... 310/156.12, 310/216.55–216.64, 254.1, 265
See application file for complete search history.

(56) References Cited

U.S. PATENT DOCUMENTS

| | | | |
|---|---|---|---|
| 3,849,683 A * | 11/1974 | Leistner | 310/216.086 |
| 4,276,490 A | 6/1981 | Saldinger | |
| 4,469,970 A * | 9/1984 | Neumann | 310/156.78 |
| 4,642,502 A * | 2/1987 | Carpenter et al. | 310/156.12 |
| 4,712,035 A | 12/1987 | Forbes et al. | |
| 4,792,281 A | 12/1988 | Coleman | |
| 5,320,491 A | 6/1994 | Coleman et al. | |
| 5,354,175 A | 10/1994 | Coleman et al. | |
| 5,378,953 A * | 1/1995 | Uchida et al. | 310/156.59 |
| 5,527,151 A | 6/1996 | Coleman et al. | |
| 5,527,152 A | 6/1996 | Coleman et al. | |
| 5,771,566 A | 6/1998 | Pop, Sr. | |
| 5,786,650 A * | 7/1998 | Uchida et al. | 310/156.55 |
| 5,877,578 A * | 3/1999 | Mitcham et al. | 310/268 |
| 5,894,183 A | 4/1999 | Borchert | |

(Continued)

OTHER PUBLICATIONS

Excerpt from the U.S. Department of Energy, Wind & Hydropower Technologies Program: "How Wind Turbines Work." 6 pages. Date: Nov. 30, 2006.

(Continued)

*Primary Examiner*—Thanh Lam
(74) *Attorney, Agent, or Firm*—Jansson Shupe & Munger Ltd

(57) ABSTRACT

A permanent magnet apparatus (10) for achieving electrical performance is provided. The apparatus (10) includes a cylindrical stator assembly (12) having a plurality of stator pole assemblies (92) and a cylindrical rotor assembly (14) having a plurality of rotor pole assemblies (20). Each stator pole assembly (92) includes a wire coil (102) and a laminated stack (98) of axially aligned stator segments (100). Each of the stator segments (100) has a center-post portion (106) that is detachably engaged to a back-iron portion (104). Each rotor pole assembly (20) is provided with a laminated stack (28) of axially aligned rotor segments (30) to which is secured a permanent magnet (32). Preferably, the stator pole assemblies (92) are secured to a base plate (26) by fastening rods (74) and the stator assembly (12) includes stacks (156) of back-iron portions (104) where each stack (156) is positioned to abut two stator pole assemblies (92). The rotor pole assemblies (20) are preferably secured to a rotor plate (24) by fastening rods (74) and magnet retention-stops (66,68) defined by stacked rotor segments (28,84) frictionally support the permanent magnet (32). The apparatus (10) is most desirably operated as a low-shaft-speed, permanent magnet alternator.

17 Claims, 13 Drawing Sheets

U.S. PATENT DOCUMENTS

| | | | |
|---|---|---|---|
| 5,918,360 | A | 7/1999 | Forbes et al. |
| 5,952,755 | A | 9/1999 | Lubas |
| 5,955,807 | A * | 9/1999 | Kajiura et al. ......... 310/156.66 |
| 6,005,318 | A | 12/1999 | Pop, Sr. |
| 6,006,418 | A | 12/1999 | Takeda et al. |
| 6,049,153 | A | 4/2000 | Nishiyama et al. |
| 6,057,621 | A * | 5/2000 | Suzuki et al. ......... 310/216.079 |
| 6,104,117 | A | 8/2000 | Nakamura et al. |
| 6,362,553 | B1 * | 3/2002 | Nakahara et al. ...... 310/216.004 |
| 6,452,301 | B1 * | 9/2002 | Van Dine et al. ....... 310/156.12 |
| 6,483,221 | B1 * | 11/2002 | Pawellek et al. ...... 310/216.064 |
| 6,492,756 | B1 | 12/2002 | Maslov et al. |
| 6,693,409 | B2 | 2/2004 | Lynch et al. |
| 6,717,314 | B2 | 4/2004 | Horst et al. |
| 6,727,623 | B2 | 4/2004 | Horst et al. |
| 6,741,010 | B2 * | 5/2004 | Wilkin ....................... 310/268 |
| 6,777,851 | B2 | 8/2004 | Maslov |
| 6,891,298 | B2 | 5/2005 | Gary |
| 6,940,199 | B2 | 9/2005 | Imamura et al. |
| 6,946,766 | B2 | 9/2005 | Gary et al. |
| 7,042,118 | B2 | 5/2006 | McMullen et al. |
| 7,075,192 | B2 | 7/2006 | Bywaters et al. |
| 7,109,600 | B1 | 9/2006 | Bywaters et al. |
| 7,119,453 | B2 | 10/2006 | Bywaters et al. |
| 7,145,266 | B2 | 12/2006 | Lynch et al. |
| 7,183,665 | B2 | 2/2007 | Bywaters et al. |
| 7,205,695 | B2 * | 4/2007 | Smith .................. 310/216.004 |
| 2004/0021394 | A1 | 2/2004 | Maeda et al. |
| 2005/0099079 | A1 | 5/2005 | McMullen et al. |
| 2006/0103254 | A1 | 5/2006 | Horst |
| 2006/0119203 | A1 | 6/2006 | Brown et al. |

OTHER PUBLICATIONS

American Wind Energy Association. "What are the Basic Wind Turbine Configurations?" 2 pages. Date: Copyright 1998.

Danish Wind Industry Association. "Gearboxes for Wind Turbines." 3 pages. Date: Copyright 1997-2003. Updated Sep. 19, 2003.

Alxion Automatique & Productique. "STK Wind Turbine Alternators." 6 pages. Date: Undated.

U.S. Department of Energy. "Wind Partnerships for Advanced Component Technology: WindPACT Advanced Wind Turbine Drivetrain Designs." 1 page. Date: Mar. 2006.

U.S. Department of Energy. "Low Wind Speed Technology Phase II: Development of a 2-MW Direct-Drive Wind Turbine for Low Wind Speed Sites." 1 page. Date: Mar. 2006.

* cited by examiner

PERMANENT MAGNET ALTERNATOR WITH SEGMENTED CONSTRUCTION

RELATED APPLICATION

This application claims the benefit of U.S. Provisional Application No. 60/838,082, filed on Aug. 16, 2006, which is a continuation of PCT Application No. PCT/US2007/018071, filed on Aug. 16, 2007 and are hereby incorporated by reference.

FIELD OF THE INVENTION

This invention is related generally to permanent magnet electrical devices and, more particularly, to permanent magnet alternators capable of operation at low shaft speed.

BACKGROUND OF THE INVENTION

Permanent magnet machines operate in a well known fashion, utilizing a non-stationary member called the rotor securing a plurality of magnets and a stationary member entitled the stator embedded with a plurality of wire coils with which the rotor elements electro-magnetically interact. Torque is communicated to or from the rotor relative to the stator mechanically by means of a shaft that is co-axial to both the rotor and the stator.

Where the permanent magnet apparatus serves as an electrical alternator, torque is transferred to the rotor elements from an external power source for purposes of inducing electrical currents in the wire coils of the stator elements so that mechanical work is converted into electrical energy. Where, on the other hand, the apparatus is an electric motor, torque is transferred from the rotor elements to the shaft for the performance of external work by being magnetically driven when electrical current passes through the stator wire coils.

The focus of recent technological developments in alternator design has been upon higher shaft speeds. This achieves more efficient electrical output at greatly decreasing diameters in the size of the alternator. Such alternators can operate at speeds as high as 24,000 revolutions per minute (rpm). In particular, this focus has led to advances in the very materials used in the alternators, materials such as magnetic steel alloys and permanent magnets. Although the expense associated with these improved materials is quite high, their use in high speed alternators is still cost-effective since they are able to achieve improved performing alternators despite utilizing less material.

Another type of alternator, one carrying torque from a relatively less intense power source, operates instead at shaft speeds ranging from 300 rpm to as low as 20 rpm. With these low-shaft-speed alternators, the increased cost in materials becomes highly significant since these machines, due to their greater overall diameter, require much more material for an increased number of stator and rotor elements than their high speed counterparts. The larger diameter of these devices is unavoidably necessary if the magnets are to achieve the level of speed or tangential velocity needed for the rotor to effectively induce the desired electrical output.

Conventional low-speed alternators typically utilize rotors constructed from a solid cylindrical band of magnetic steel. Unlike high-speed alternators whose rotors are assembled from laminated circular plates stamped from thin sheets the width of the rotor, the comparatively larger diameter of the low-speed devices makes a similar process prohibitively expensive since the stamping required to form such plates needs extremely large and expensive tooling, leaving a great amount of wasted material as well.

In addition, electrical alternators often represent a significant portion of the overall cost of any power-generating system. Alternator expense can have a profound effect on the ultimate success or failure of a particular design for such a system. Total manufacturing, labor and material costs therefore impact not only upon the ultimate price of the alternator but also upon the viability of the power-generating apparatus in which it will be used.

Wind-generated power devices are one example of these power-generating systems. Wind-generated power is a needed and highly desirable alternative to power created by utilities using coal, natural gas or other non-renewable sources. Over the past two years, the United States has increased its wind-power capacity faster than any other country with wind farms now operating in at least 36 states. Wind farms generate electricity by using wind to turn giant blades that, in turn, rotate wind turbines. A recent study has predicted that wind farms may be generating 7% of the nation's electricity by the year 2023.

A wind turbine mechanically connects the shaft on which the blades turn to an alternator. Wind turbines can range in size of their electrical output from several megawatts to less than one kilowatt. The latter turbines are often used for homes in locations where a connection to the utility grid is not available or not desired.

The shaft to a wind turbine rotates, however, at a speed ranging from just 30 to 60 rpm. A gear box is therefore required in order to increase the rotational speed to at least 1000 to 1800 rpm since these are the speeds needed for the turbine to utilize high-speed alternators. Since they can operate at the low shaft speeds of the wind turbine, low-speed alternators, on the other hand, are considered "direct-drive" alternators. As a consequence, these devices at least eliminate the need for a costly and heavy gear box, reducing not only the amount of maintenance required by a turbine but also removing the complexity and energy loss associated with this particular transmission process.

While the electrical frequencies produced by direct-drive alternators may be quite low, the efficiency losses associated with higher frequency/high-speed alternators are, however, not as pronounced. A low-speed alternator that is low in cost and easily assembled would therefore be highly desirable for use with wind turbines as well as other similarly cost-sensitive power-generating systems.

SUMMARY OF THE INVENTION

This invention is for a permanent magnet apparatus, preferably a permanent magnet alternator. The apparatus is provided with a cylindrical stator assembly having a plurality of stator pole assemblies positioned along the perimeter of the stator assembly and a cylindrical rotor assembly having a plurality of rotor pole assemblies spaced along the perimeter of the rotor assembly. The rotor assembly is coaxial along a central axis with the stator assembly to allow it to freely rotate with respect to the stator assembly and to position the rotor pole assemblies so that they move in proximity to the stator pole assemblies for achieving the desired electrical performance by the apparatus.

Each stator pole assembly includes a wire coil and a laminated stack of several substantially axially aligned stator segments. The term "laminated" as used herein means that the structure is constructed by stacking the segments associated with that structure in layers. The term "axially aligned" as used herein means that the structures are placed or arranged in proper congruent orientation in the direction of the central axis. Each of the stator segments has a center-post portion that detachably engages a back-iron portion. The wire coil is disposed about a stator-wall that is defined by the stacking of the center-post portions. Each rotor pole assembly comprises a laminated stack of a number of rotor segments that are substantially axially aligned with a permanent magnet secured to the stack.

In certain exceptional embodiments, the stator assembly also includes a base plate that has a plurality of fastening rods mounted upon it. Each of these fastening rods extend outward and perpendicular to the base plate. By providing each back-iron portion with at least one aperture, preferably two apertures, each stator pole assembly includes a channel defined by these apertures within the aligned stack of back-iron portions. Each channel is sized to snugly receive one fastening rod in order to secure the stator pole assembly to the base plate. The term "snugly" as used herein means that the diameter of the channel is only slightly greater than the outside diameter of the fastening rod so that it nestles or fits closely within the channel to allow the rod to move freely longitudinally but not laterally therein.

More desirable is where the stator assembly includes in addition at least one stator end-extension. Each stator end-extension has several laminated stator extension-stacks positioned along the perimeter of the stator assembly. Each of these stator extension-stacks is comprised of a plurality of the back-iron portions in substantial axial alignment. In addition, each stator extension-stack straddles and axially abuts at least two stator pole assemblies. Most desirable is when a first stator end-extension is positioned above the stator pole assemblies and a second stator end-extension is positioned below the stator pole assemblies. Highly desirable is where each stator extension-stack defines a channel sized to snugly receive a fastening rod for securing the entire stator end-extension to the base plate.

One preferred embodiment finds the rotor assembly including at least one rotor plate having a number of fastening rods mounted upon it. Each of these fastening rods extend outward and perpendicular to the rotor plate. Each rotor segment is provided with at least one aperture, preferably two apertures, so that each rotor pole assembly includes a channel defined by these apertures within the aligned stack of rotor segments. Each of these channels is adapted to snugly receive a fastening rod to secure the rotor pole assembly to the rotor plate.

Most preferred embodiments find the rotor assembly further includes at least first and second rotor end-extensions, each rotor end-extension having a plurality of laminated rotor extension-stacks positioned along the perimeter of the rotor assembly, each rotor extension-stack comprising a plurality of substantially axially aligned rotor segments, abutting at least two rotor pole assemblies and defining a channel for receiving one fastening rod to secure the corresponding rotor end-extension to the rotor plate, the first rotor end-extension being positioned above the rotor pole assemblies and the second rotor end-extension being positioned below the rotor pole assemblies.

Highly preferred is where the distal edge on each rotor segment includes first and second rotor tabs that are positioned adjacent to the rotor segment's first and second side edges respectively. These rotor tabs are coplanar with the rotor segment, extending outward from the distal edge. Given the axial alignment of the rotor segments comprising each rotor extension-stack and each rotor pole assembly, the rotor tabs define first and second magnet retention-stops that extend axially along both the rotor extension-stack and the rotor pole assembly. A most desirable embodiment is where the permanent magnet is sized so that it is frictionally supported in position the rotor pole assembly upon at least two sides by these magnet retention-stops.

In other desirable embodiments, each back-iron portion has a coplanar stator interlocking-projection extending outward from its first side edge and its second side edge defining a stator interlocking-notch. Each interlocking-notch on one back-iron portion is adapted to snugly receive the interlocking-projection on another back-iron portion to join both portions along their abutting side edges. The axially aligned stator interlocking-projections on the back-iron portions stacked together define a stator locking-member on one side of the stator pole assembly. Likewise, the axially aligned stator interlocking-notches along each stator pole assembly define a stator latching-member on the other side. The stator locking-member on one stator pole assembly can then be inserted into the stator latching-member on another stator pole assembly to mechanically join the first to the second.

Most desirable is where the first and second back-iron side edges define first and second back-iron radial lines respectively that, at their point of intersection, form an angle defined as the back-iron angle. The back-iron angle is selected so that all of the stator pole assemblies can be joined together to form an integral and substantially circular ring. This permits the stator pole assemblies to be tangentially and radially secured together without the need for any support or frame distal to the stator pole assemblies to act radially inward upon them.

Another embodiment that is much preferred finds each rotor segment having a coplanar rotor interlocking-projection extending outward from its first side edge and its second side edge forming a rotor interlocking-notch. Each interlocking-projection on a rotor segment is sized to fit snugly within the interlocking-notch upon another rotor segment to join both segments along their facing side edges. The axially aligned rotor interlocking-projections on the rotor segments that are stacked together define a rotor locking-member along the side of the rotor pole assembly. Likewise, the axially aligned rotor interlocking-notches along each rotor pole assembly define a rotor latching-member on the opposite side. The rotor locking-member upon a rotor pole assembly can then be inserted into the rotor latching-member upon another rotor pole assembly to mechanically join the two together.

Highly preferred is where the first and second rotor-segment side edges define first and second rotor-segment radial lines that intersect, defining an angle at the point of intersection identified as the rotor-segment angle. The rotor-segment angle is selected so that all of the rotor pole assemblies can be joined together to form an integral and substantially circular ring. This structure permits the rotor pole assemblies to be tangentially and radially secured together without the need for any manner of support, such as a frame, acting radially inward upon the rotor pole assemblies to be positioned distal to them.

Certain other desirable embodiments have the stator assembly defining a cavity between the central axis and the stator pole assemblies that is sized so that it can receive the rotor assembly in a manner such that the stator pole assemblies are radially spaced distal to and in magnetic communication with the rotor pole assemblies. Most desirable is where the rotor assembly includes a shaft along the central axis and the shaft is in mechanical engagement with the rotor pole assemblies for carrying torque to and from them. More desirable is where the shaft is adapted to be externally rotated in operation so that the apparatus serves as a permanent magnet alternator whereby electrical current is induced in each of the plurality of wire coils. A highly desirable embodiment finds that the permanent magnet alternator operates where the shaft rotates at a speed less than 300 revolutions per minute.

DETAILED DESCRIPTION OF PREFERRED EMBODIMENTS

Figure 1:
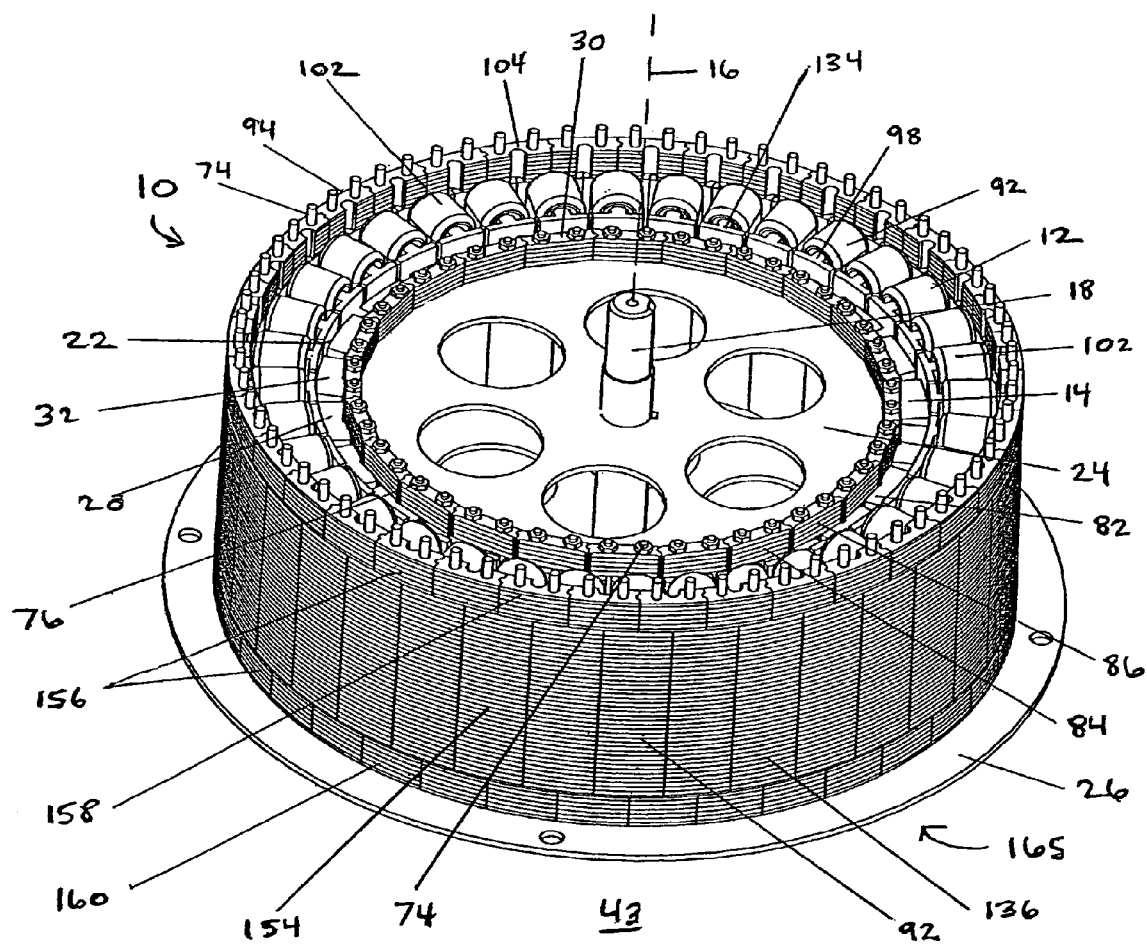
FIG. 1 is a perspective view of a preferred permanent magnet apparatus in accordance with this invention having the cover plate removed.

The figures illustrate preferred embodiments of an improved permanent magnet apparatus 10 in accordance with this invention. As illustrated in FIG. 1, apparatus 10 includes stator assembly 12 and rotor assembly 14. Both assemblies 12, 14 are coaxial to central axis 16 defined by rotor shaft 18.

Rotor assembly 14 is shown provided with a set or plurality of rotor pole assemblies 20 circumferentially spaced around the perimeter 22 of the rotor assembly 14 adjacent to stator assembly 12. The term "plurality" as used herein means a number not less than two. The number of rotor pole assemblies 20 will vary with different embodiments of apparatus 10 based upon such factors as the diameter of the rotor, the radial width of each rotor pole assembly, and the circumferential spacing, if any, between adjacent rotor pole assemblies. For the preferred embodiment illustrated in FIGS. 1-2, 6-8, 12-15, twenty-four (24) rotor pole assemblies 20 comprise the rotor assembly 14.

Each rotor pole assembly 20 is directly secured to at least one and preferable two rotor plates 24 in a manner described in more detail below. Rotor plates 24 are supported upon rotor shaft 18. Bearings (not shown), such as end-bells are fastened to the stator base plate 26 and cover plate 27 to align and allow rotor assembly 14 to turn in proper relation to stator assembly 12 for the desired electrical machine function. The rotor shaft 18 extends some axial length beyond cover plate 27 or base plate 26 (top or bottom of apparatus 10) for convenient mechanical connection to the desired power element for transmitting torque. One skilled in the art will readily recognize that spokes, rods or a rotor hub can be used in place of rotor plates.

Figure 2:
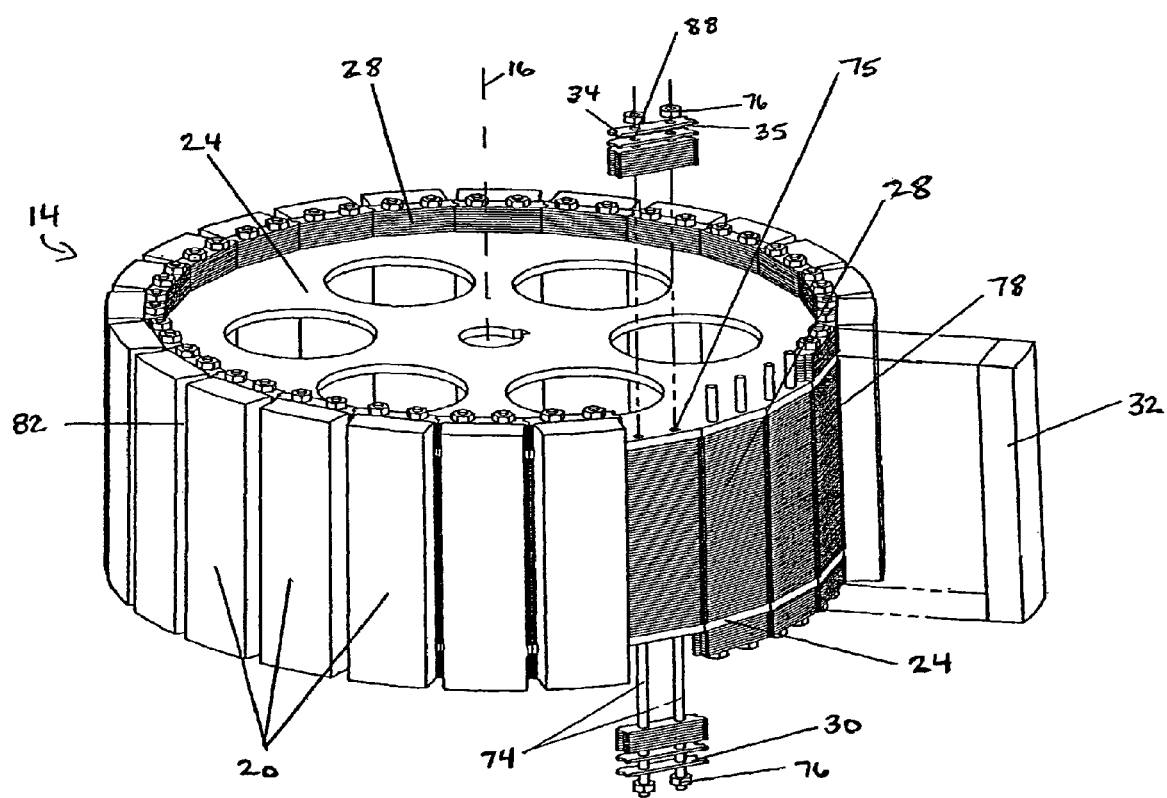
FIG. 2 is a partially exploded view of a partially assembled rotor assembly in accordance with this invention.
Figure 3:
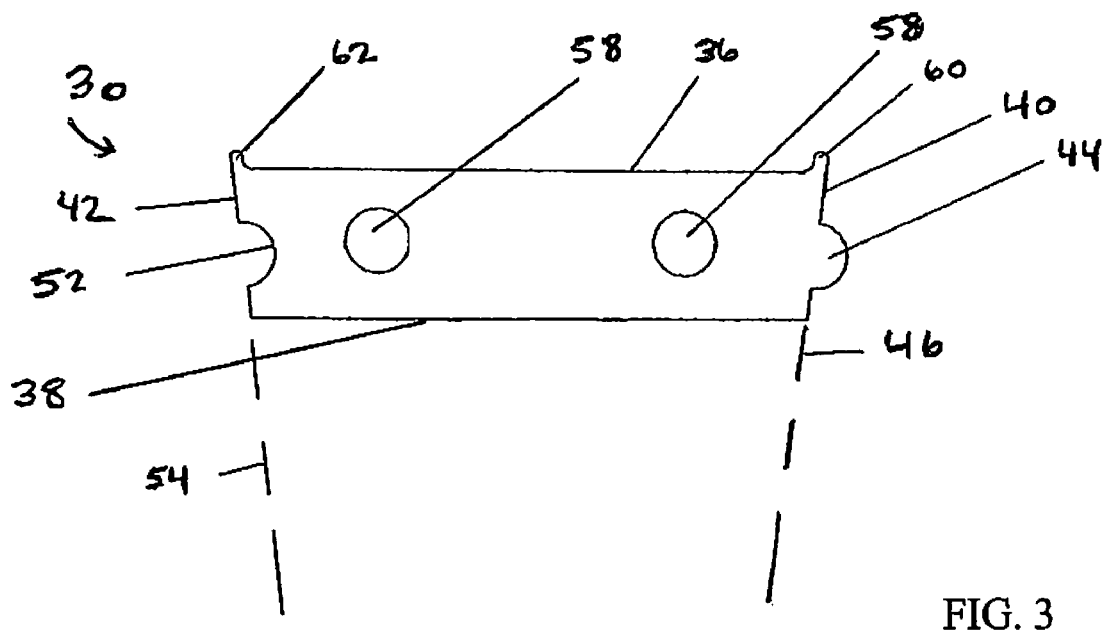
FIG. 3 is a top view of a preferred rotor segment in accordance with this invention.

Each rotor pole assembly 20 is shown in FIG. 2 as being comprised of a laminated rotor stack 28 of a plurality of substantially identical magnetic rotor segments 30 and a permanent magnet 32 that is rigidly mounted to rotor stack 28. Each rotor stack 28 is laminated with individually aligned rotor segments 30 to insure good magnetic flux transmission is maintained in the plane of rotation to complete the magnetic circuit between assemblies 20 from magnet 32 to magnet 32 while not losing flux passing axially upward or downward. Rotor segment 30, as seen in FIG. 3, is a unitary, substantially planar piece provided with symmetrical upper and lower surfaces 34, 35, spaced apart by distal edge 36, proximal edge 38, and first and second rotor-segment side edges 40, 42. Edges 36, 38, 40, 42 are of equal depth. Considerations of electrical performance and mechanical stability determine the axial length of rotor stacks 28. Rotor segments 30 are of the necessary radial thickness to efficiently carry magnetic flux. Distal edge 36 is equidistant from proximal edge 38.

The terms "top", "upper", "bottom" and "lower", as well as other words having similar meaning, provide relative positioning with respect to a vertical dimension defined by central axis 16 and are used herein for ease in discussing the embodiments of the present invention depicted in FIGS. 1-16. Central axis 16 is illustrated in FIG. 1 as extending vertically upward from and collinear with shaft 18. Central axis 16 is orthogonal to base plate 26 of apparatus 10 shown resting upon surface 43. One skilled in the art will readily recognize, however, that the present permanent magnet apparatus can be used in any orientation whereby "upward" is axially outward from base plate 26 along central axis 16.

The terms "distal" and "proximal" provide relative positioning with respect to a radial dimension originating at and in a plane orthogonal to central axis 16.

Figure 8:
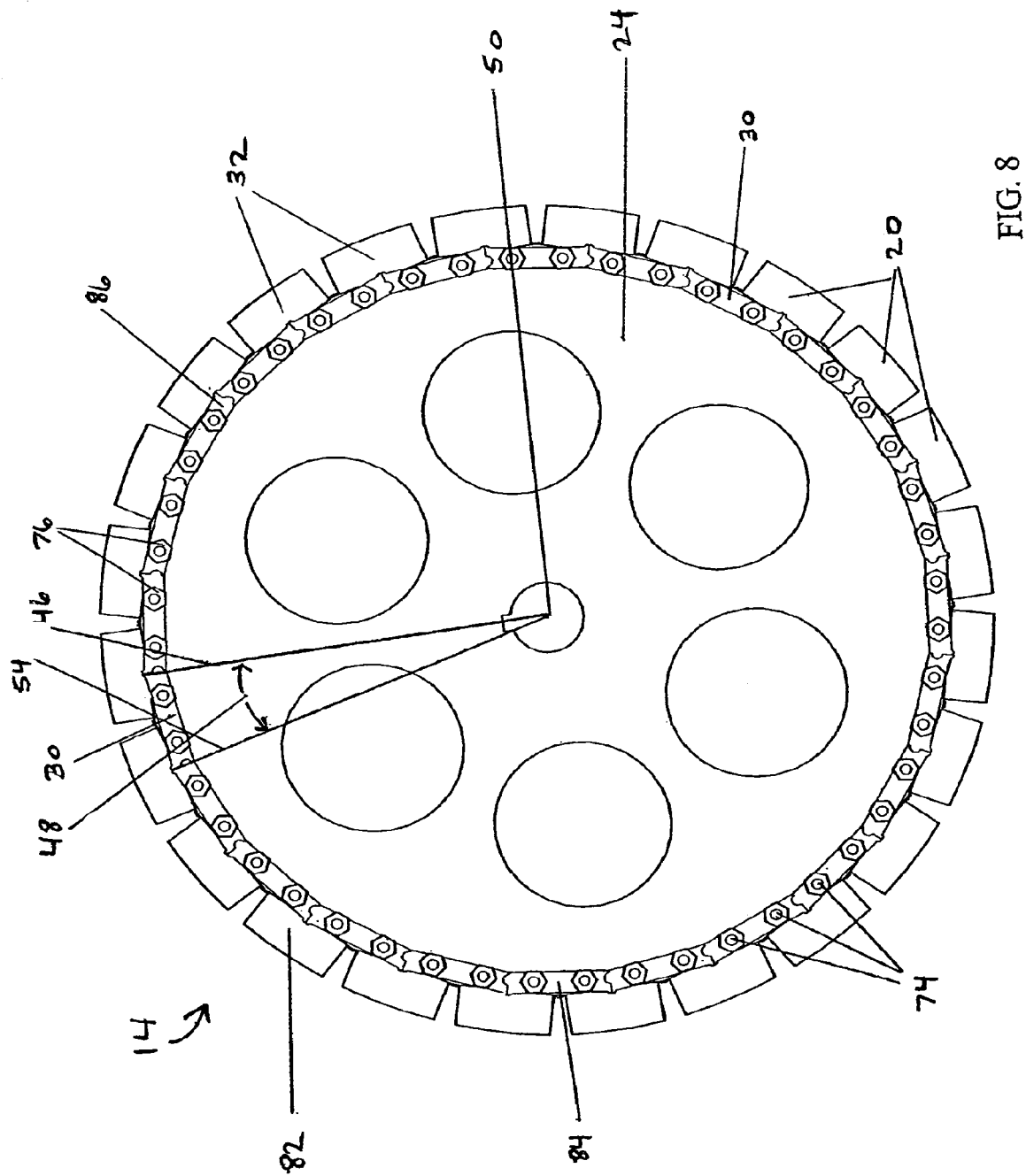
FIG. 8 is a top view of the rotor assembly in FIG. 6.

First rotor-segment side edge 40 is orthogonal to upper and lower surfaces 34, and extends between distal edge 36 and proximal edge 38. Rotor interlocking-projection 44 extends outward from first rotor-segment side edge 40 and is coplanar and unitary with rotor segment 30. As shown in FIG. 3, first rotor-segment side edge 40 defines first rotor-segment radial line 46 that together with second rotor-segment radial line 54 defined by second rotor-segment side edge 42 define rotor-segment angle 48. As seen in FIG. 8, first and second radial lines 46, 54 intersect at center point 50. Rotor-segment angle 48 constitutes the angle formed at center point 50 by first and second radial lines 46, 54. Center point 50 is the point of intersection between central axis 16 and the plane of rotor segment 30 in FIG. 8.

FIG. 3 further illustrates that second rotor-segment side edge 42 is opposite to first rotor-segment side edge 40 and is also orthogonal to surfaces 34, 35. Rotor interlocking-notch 52 is recessed within second rotor-segment side edge 42. For the preferred embodiment shown in FIGS. 1-8, 12, the rotor-segment angle is 15°, thereby allowing all of the rotor pole assemblies 20 comprising rotor assembly 14 to form an integral and substantially circular rotor ring 82.

Figure 4:
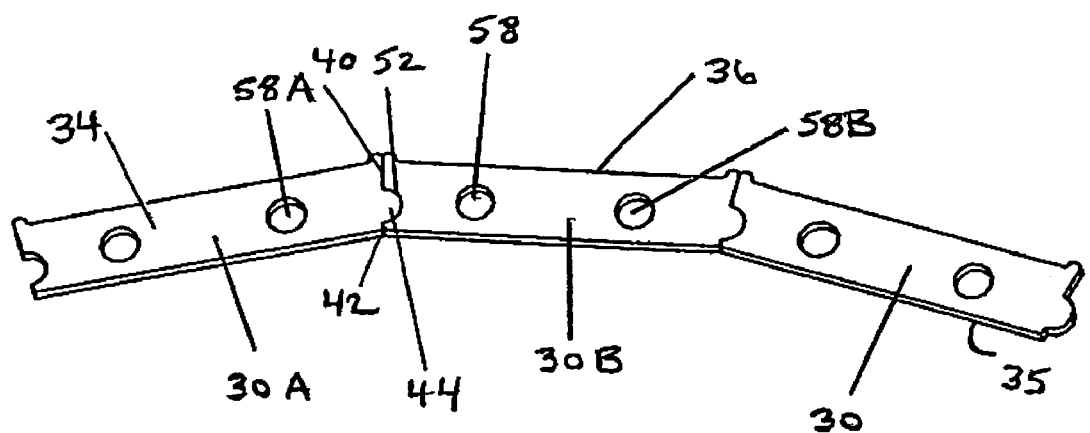
FIG. 4 is a perspective view of three of the rotor segments in FIG. 3 interlocked.

For reasons discussed below, rotor interlocking-notch 52 is configured to have a geometry adapted to allow rotor interlocking-notch 52 to receive rotor interlocking-projection 44 upon an adjacent rotor segment 30 so that projection 44 nestles or fits snugly within notch 52. Furthermore, as illustrated in FIG. 4, rotor interlocking-projection 44 is positioned along first rotor-segment side edge 40 upon rotor segment 30A to be in registry with rotor interlocking-notch 52 along second rotor-segment side edge 42 upon rotor segment 30B when rotor segment 30A is placed edge to edge with rotor segment 30B. In this manner of engaging projection 44 on rotor segment 30A with notch 52 on rotor segment 30B, adjacent rotor segments 30 can be joined and locked together along side edges 40, 42 so that first edge 40 tightly abuts second edge 42 to leave a minimal air gap between edges 40, 42. Although rotor interlocking-projection 44 is shown in FIGS. 1-8, 12 as having a semi-circular geometry, one skilled in the art will recognize that other shapes or curves are possible that permit sufficient surface contact when rotor interlocking-projection 44 nestles within and abuts rotor interlocking-notch 52.

Rotor segment 30 furthermore includes two rotor-segment apertures 58. These apertures 58 are positioned equidistantly from distal edge 36 and are circumferentially spaced apart from each adjacent aperture 58A, 58B regardless of whether that adjacent aperture is located on the same rotor segment 30B or an abutting rotor segment 30A as shown in FIG. 4. For the preferred embodiment shown in FIGS. 1-8, 12, apertures 58 are placed at 3.75° from side edges 40, 42. Apertures 58 penetrate the body of rotor segment 30 extending from upper surface 34 to lower surface 35 in a direction orthogonal to both surfaces.

Distal edge 36 is linear and parallel to proximal edge 38. First and second rotor tabs 60, 62 extend outward from distal edge 36 at opposite ends of distal edge 36, positioned adjacent to first side edge 40 and second side edge 42 respectively. Rotor tabs 60, 62 are co-planar and unitary with rotor segment 30.

Rotor stack 28 of each rotor pole assembly 20 is formed by axially aligning a number of rotor segments 30. This is done by placing lower surface 35 of each segment 30 upon the upper surface 34 of the segment 30 beneath it so that each segment 30 in rotor stack 28 is in registry with the others. In this manner, each rotor pole assembly 20 has a rotor stack 28 comprised of rotor segment 30 laminations wherein apertures 58 are aligned to form rotor-pole channels 64. Likewise, first and second rotor tabs 60, 62 are aligned to form first and second magnet retention stops 66, 68. Rotor interlocking projections 44 are aligned to form rotor locking-member 70 and rotor interlocking notches 52 are aligned to form rotor latching member 72.

Rotor pole assembly 20 is assembled by slidably inserting a threaded fastening rod 74 into each of the two rotor-pole channels 64 to axially secure rotor stack 28. Rod 74 has sufficient length such that portions of rod 74 extend above and below rotor stack 28. One alternative mode of assembly is to form rotor stack 28 by using apertures 58 to stack rotor segments 30 individually upon rods 74.

Fastening rod 74 may be made from a magnetic or non-magnetic material chosen to have the desired strength for the selected dimensions of rotor assembly 14. It will be apparent to one skilled in the art, therefore, that fastening rod 74 can be fabricated from a variety of materials selected for rod 74 to withstand the forces anticipated to be applied to it in view of the particular application being made of permanent magnet apparatus 10. Although rods 74 are illustrated in FIGS. 1-2, 6-8, 12, 14-15 as cylindrical, one skilled in the art will recognize that other geometries would be acceptable for the rods as well. Such alternative rods would require channel 64 to be correspondingly adapted to have a similar cross section to that of such rods to allow the rods to be snugly received when inserted within them.

Figure 12:
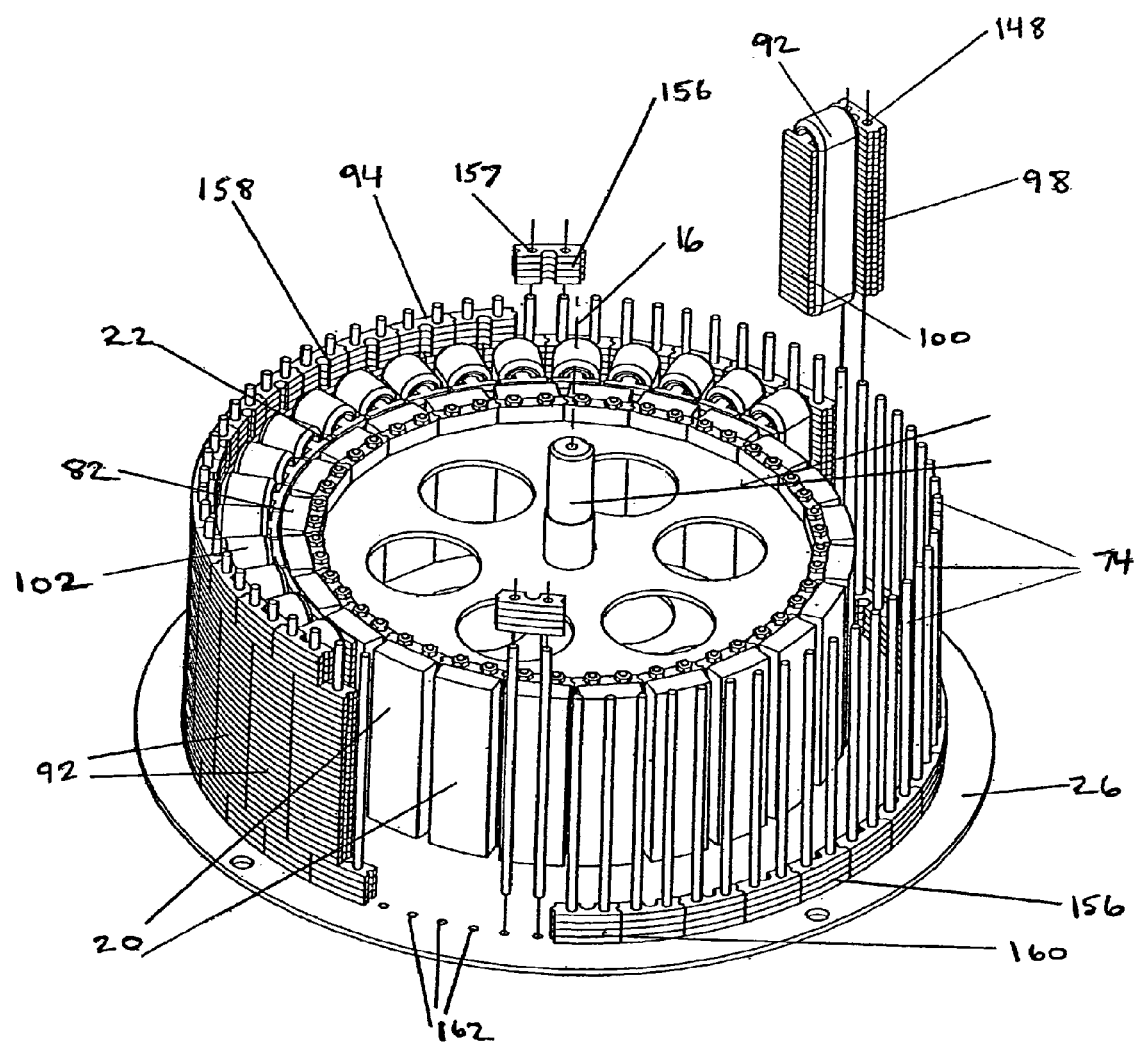
FIG. 12 is a partially exploded view of a partially assembled permanent magnet apparatus in accordance with this invention.

Rotor plate 24 is provided with apertures 75 sized to receive fastening rods 74. Apertures 75 are positioned adjacent to the outer edge of rotor plate 24. Apertures 75 are circumferentially spaced apart the same distance as rotor-segment apertures 58 for rotor plate 24 to be in registry with rotor segments 30. As illustrated in FIGS. 1-2, 6-8, 12, fastening rods 74 mechanically connect rotor plates 24 to rotor stack 28 of each rotor pole assembly 20. This connection enables mechanical torque to be transmitted from shaft 18 to rotor pole assemblies 20. Rotor plates 24 are preferably positioned along the axial top and bottom ends 56, 57 of rotor pole assemblies 20 comprising rotor assembly 14 as seen in FIGS. 1, 6-8, or at intervals along the axial length of these assemblies 20 as shown in FIGS. 2, 12.

By insuring that magnetic material required for rotor assembly 14 is present in the laminated rotor stack 28 of each rotor pole assembly 20, torque-transmitting elements such as shaft 18 or rotor plates 24 can be made from lighter non-magnetic material and formed in any useful shape. As a result, these torque-transmitting structures can be reduced in both volume and weight.

Figure 6:
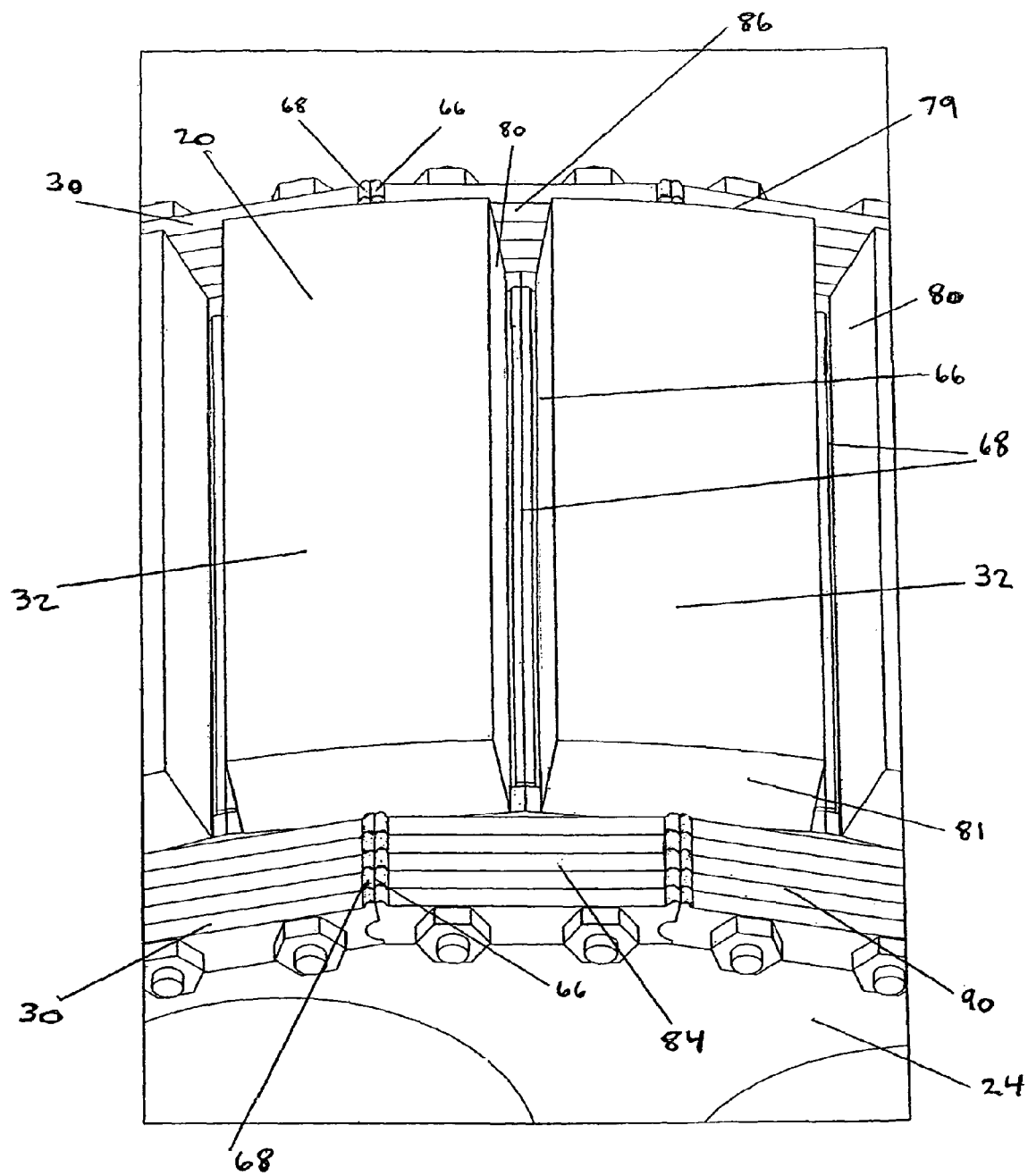
FIG. 6 is a fragmentary perspective view of a preferred rotor assembly in accordance with this invention.

Distal edges 36 upon rotor segments 30 of rotor stack 28 define magnet receiving surface 78. Permanent magnet 32 is rigidly secured to surface 78 using an adhesive or a common electrical impregnation resin as the bonding substance. Magnet 32 is also held in position along its side edges 80 by first and second retention stops 66, 68. Magnet 32 is sized so that first and second magnet retention stops 66, 68 can frictionally receive and grip magnet 32 between them. Furthermore, this assists during assembly in the alignment and fastening of magnet 32 to rotor stack 28. Adjacent first and second magnet retention stops 66, 68 upon adjacent rotor pole assemblies 20 as shown in FIG. 6, on the other hand, assist in keeping magnets 32 on these assemblies 20 magnetically and physically apart.

Figure 5:
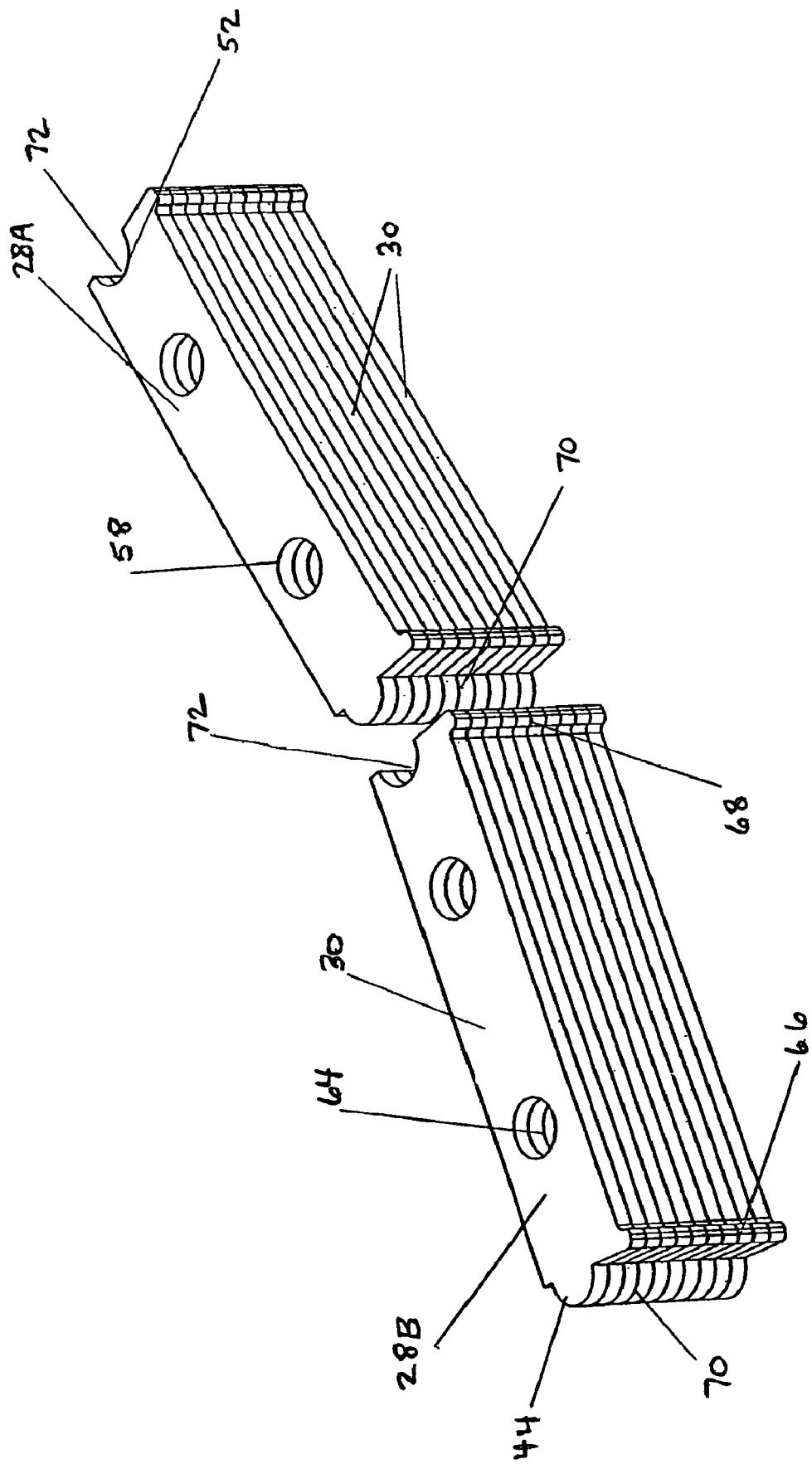
FIG. 5 is a perspective view of two preferred rotor stacks in accordance with this invention.

Adjacent rotor pole assemblies 20 are joined together to form an integral rotor ring 82 around perimeter 22 of rotor assembly 14. As shown in FIG. 5, rotor locking-member 70 on first rotor stack 28A is configured to nestle tightly within rotor latching-member 72 on second rotor stack 28B. For reasons explained above with respect to the geometries of rotor interlocking-projection 44 and rotor interlocking-notch 52 upon rotor segment 30, rotor locking-member 70 and rotor latching-member 72 provide a good mechanical fit between rotor pole assemblies 20 to ensure good magnetic flux transmission in the plane of rotation between adjoining assemblies 20 at their abutting edges as seen in FIGS. 2, 12.

Figure 7:
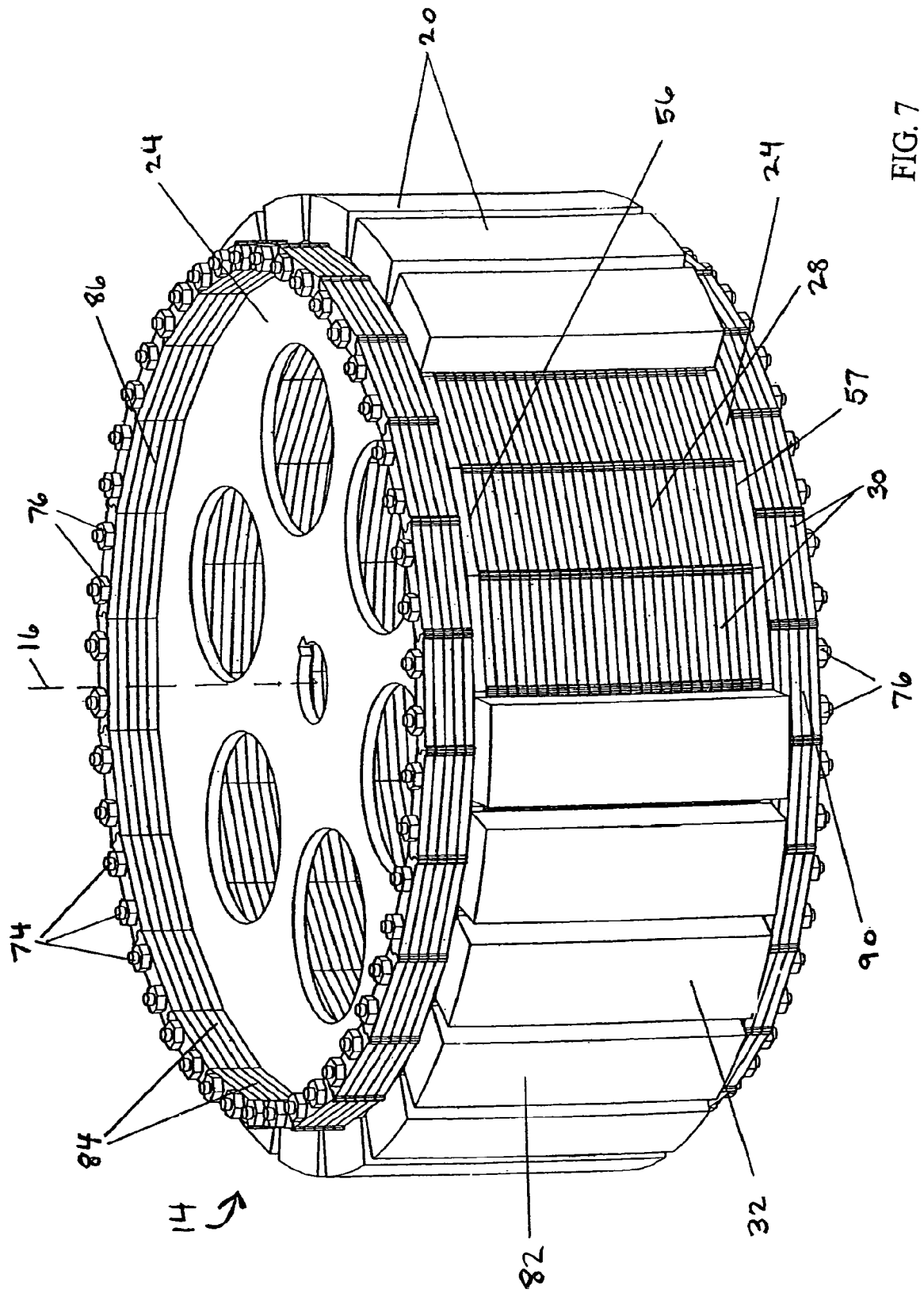
FIG. 7 is a perspective view of the partially assembled rotor assembly in FIG. 6.

In addition to being utilized to comprise rotor stacks 28 of rotor pole assemblies 20, rotor segments 30 are also axially aligned to form laminated rotor extension-stacks 84. A pair of rotor extension-stacks 84 can be attached to each other in the same manner as illustrated in FIG. 5 by engaging the rotor locking-member 70 on one rotor extension-stack 84 to the rotor latching-member 72 on the other. As with rotor stacks 28, apertures 58 upon the rotor segments 30 in each rotor extension-stack 84 are in registry to define rotor extension-stack channels 88 sized to frictionally receive fastening rods 74. FIG. 7 shows how each rotor extension-stack 84 is positioned upon the top and bottom ends 56, 57 of rotor pole assemblies 20 to straddle a pair of adjacent rotor stacks 28. In this manner, rotor extension-stack 84 shares at least one fastening rod 74 with each of the abutting rotor pole assemblies 20.

Rotor extension-stacks 84 above rotor stacks 28 are circumferentially joined together to form an integral first rotor end-extension 86 that rings around the top of rotor ring 82. Likewise, rotor extension-stacks 84 beneath rotor stacks 28 are also circumferentially joined together to form an integral second rotor end-extension 90 that rings the bottom of rotor ring 82. The axial stacks of rotor segments 30 supported by each fastening rod 74 is kept axially compact and secured to rod 74 by having a pair of fasteners 76, preferably lock nuts with nylon inserts, advanced along rod 74 from both of its ends until abutting the top of first rotor end-extension 86 and the bottom of second rotor end-extension 90.

This staggering or offset positioning of rotor extension-stack 84 with respect to rotor stacks 28 serves to provide mechanical reinforcement of rotor ring 82 against radial forces placed upon it during the operation of apparatus 10. First and second rotor end-extensions 86, 90 therefore perform as structural tie-straps above and below rotor ring 82. Rotor end-extensions 86, 90, fastening rods 74 and the interlocking of rotor pole assemblies 20 provide for a frame-less construction of rotor assembly 14. This reinforcement of the integral structure of rotor assembly 14 is particularly significant given the range in axial length of rotor stacks 28 in rotor pole assemblies 20 in certain embodiments of apparatus 10, since the longer the length of an unsupported column, the more it has the potential to structurally bend under a given load.

The offset positioning of rotor extension-stacks 84 above and below each rotor pole assembly 20 also places abutting first and second magnet retention stops 66, 68 upon adjacent extension-stacks 84 directly above and below magnet 32 along its axial mid-line as illustrated in FIG. 6. These paired retention stops 66, 68 serve as additional detents for frictionally gripping upper and lower edges 79, 81 of magnet 32 in the alignment and fastening of magnet 32 to rotor stack 28 during assembly.

Stator assembly 12 is provided with a plurality of stator pole assemblies 92 circumferentially spaced around the stator perimeter 94 as illustrated in FIGS. 1, 12-15. Stator assembly 12 is also configured to include a stator cavity 96 proximal to stator pole assemblies 92 that is sized to receive rotor assembly 14. The number of stator pole assemblies 92 will vary with different embodiments of apparatus 10 based upon such factors as the diameter of the stator assembly 12, the radial width of each stator pole assembly 92, and the circumferential spacing, if any, between adjacent stator pole assemblies 92. For the preferred embodiment illustrated in FIGS. 1, 12-15, thirty-six (36) stator pole assemblies 92 comprise stator assembly 12.

Figure 9:
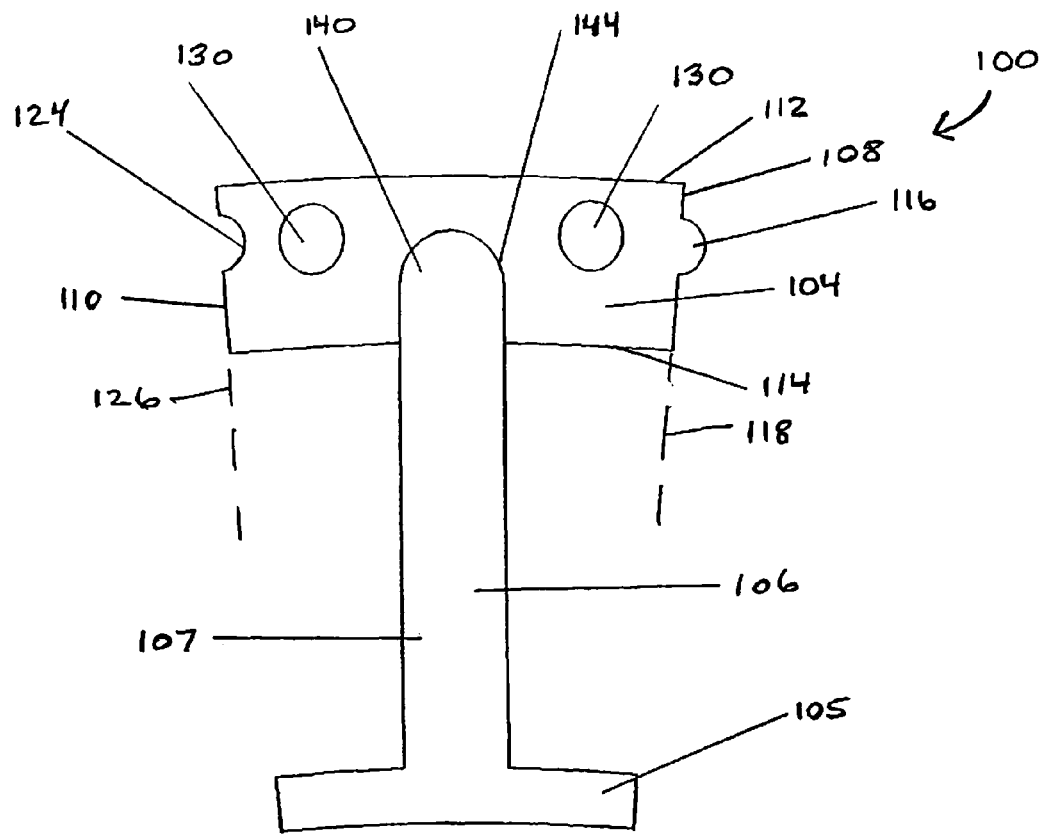
FIG. 9 is a top view of a preferred stator segment in accordance with this invention.

Each stator pole assembly 92 is shown in FIG. 12 as being comprised of a laminated stator stack 98 of a plurality of substantially identical stator segments 100 and a wire coil 102 that is mounted to stator stack 98. Stator segment 100, as seen in FIG. 9, is made up of back-iron portion 104 and center-post portion 106. Center-post portion 106 includes a center-post base section 105 and a center-post arm section 107. Back-iron portion 104 and center-post portion 106 are each unitary, substantially planar pieces having symmetrical upper and lower surfaces spaced apart by orthogonal edges of equal depth.

Back-iron portion 104, center-post portion 106 and rotor segment 30 are each preferably formed from narrow sheets of ferromagnetic material using a stamping or punching process. Ferromagnetic materials having the desired electrical and magnetic properties for the carrying and transmitting of magnetic flux include cold rolled magnetic steel and silicon alloy magnetic steel.

Back-iron portion 104 has linear first and second back-iron side edges 108, 110 extending between arcuate back-iron distal edge 112 and back-iron proximal edge 114. Distal edge 112 and proximal 114 are radially space equidistantly. Stator interlocking-projection 116 extends outward from first back-iron side edge 108 and is co-planar and unitary with back-iron portion 104. Second back-iron side edge 110 is opposite to first back-iron side edge 108. Stator interlocking-notch 124 is recessed within second back-iron side edge 110.

Figure 13:
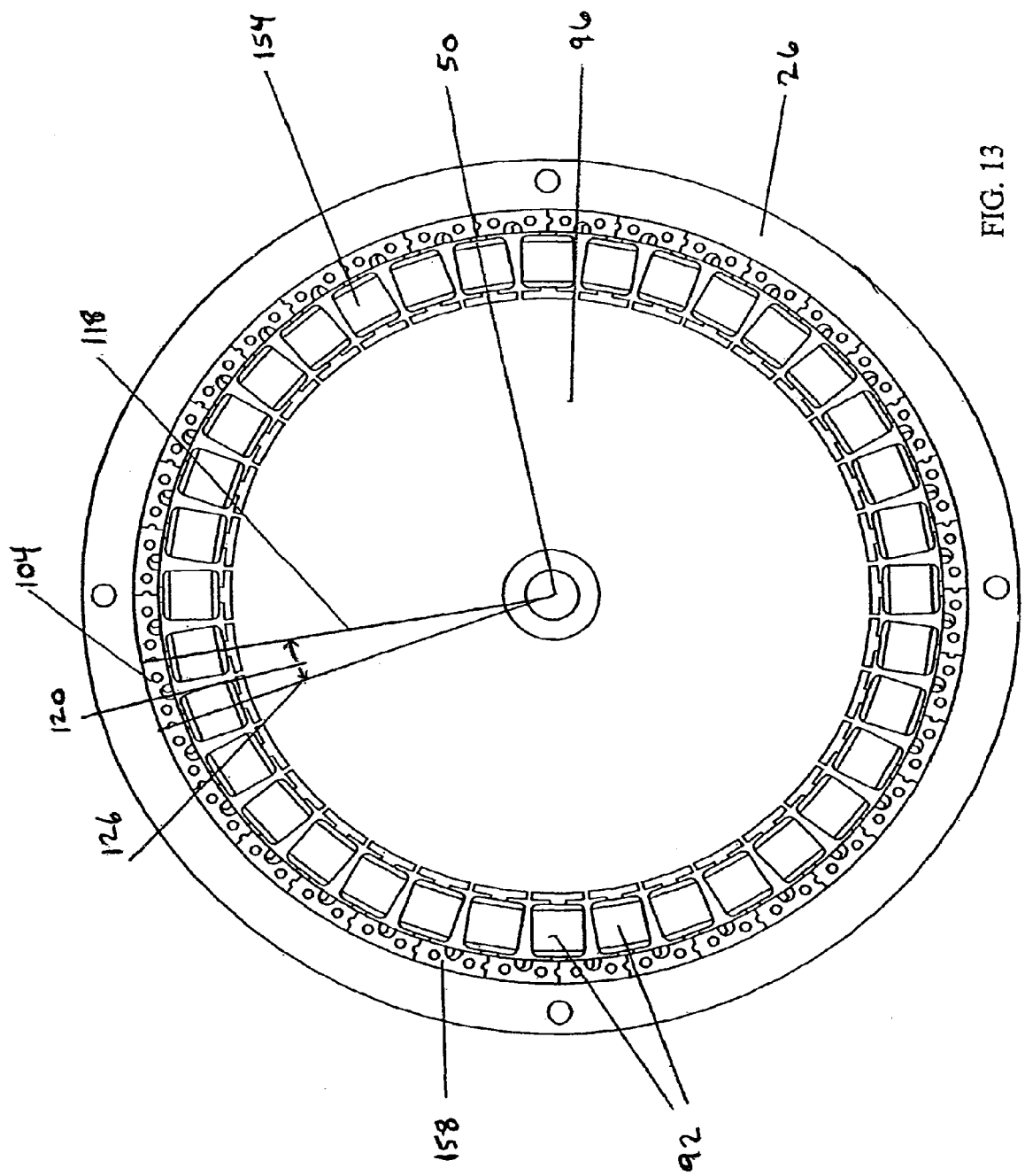
FIG. 13 is a top view of the fully assembled stator assembly in accordance with this invention.
Figure 14:
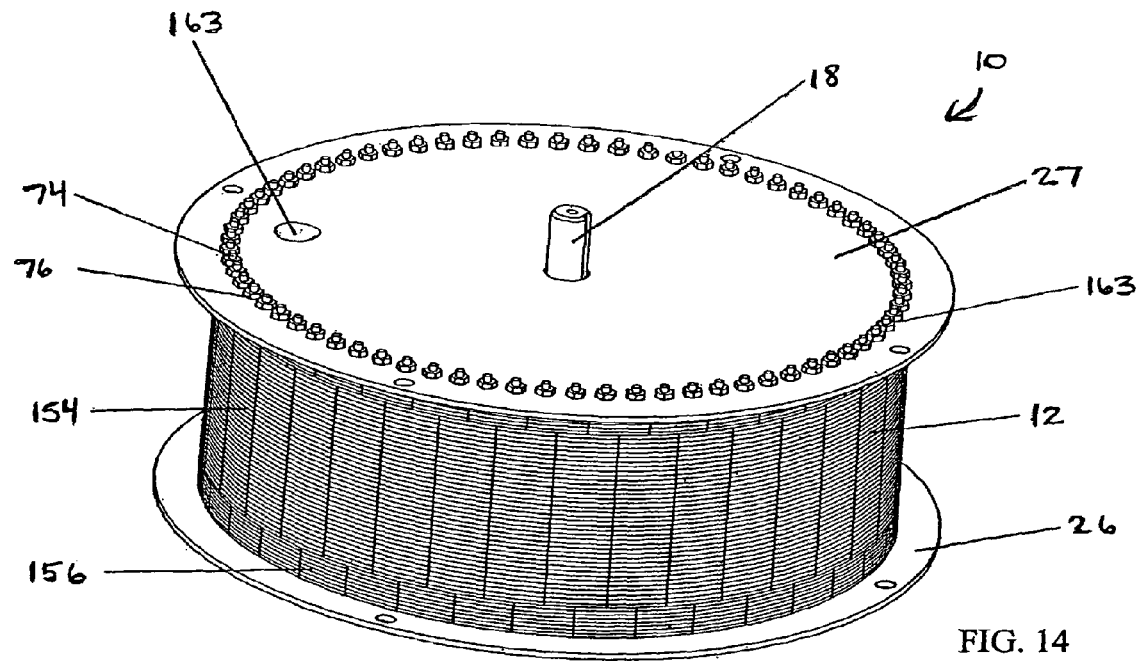
FIG. 14 is a perspective view of the apparatus in FIG. 1 with cover plate attached.
Figure 15:
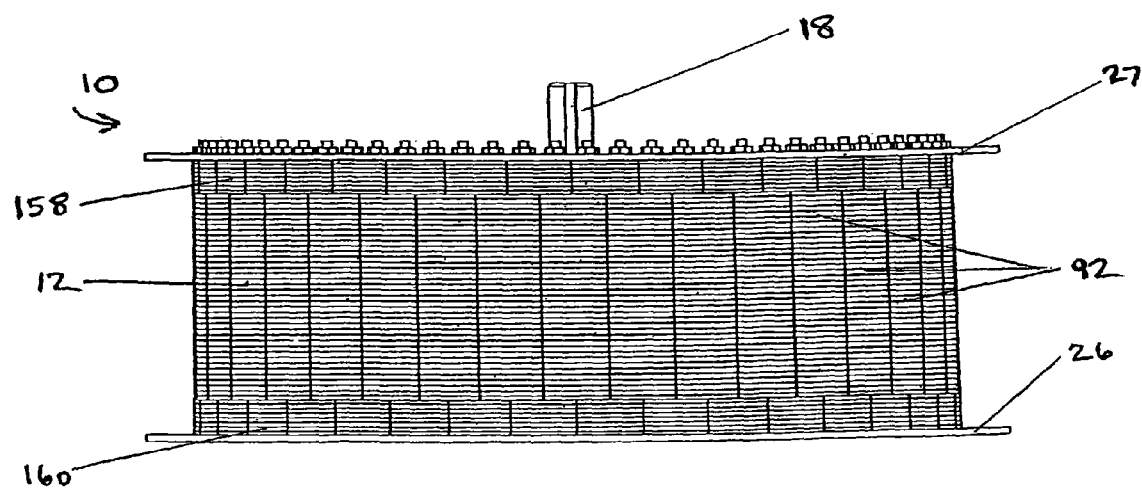
FIG. 15 is a side view of the apparatus in FIG. 14.

As shown in FIG. 9, first back-iron side edge 108 defines first back-iron radial line 118 that together with second back-iron radial line 126 defined by second back-iron side edge 110 define back-iron angle 120. As seen in FIG. 13, first and second radial lines 118, 126 intersect at center point 50. Back-iron angle 120 constitutes the angle formed at center point 50 by first and second back-iron radial lines 118, 126. Center point 50 is the point of intersection between central axis 16 and the plane of back-iron portion 104 in FIG. 13. For the preferred embodiment shown in FIGS. 1, 12-15, the back-iron angle is 10°, thereby allowing all of the stator pole assemblies 92 comprising stator assembly 12 to form an integral and substantially circular stator ring 154.

Figure 10:
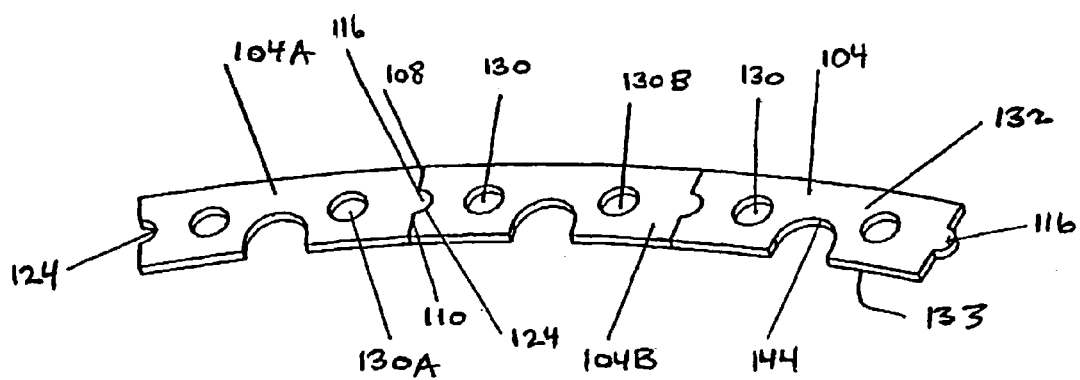
FIG. 10 is a perspective view of three of the back-iron portions in FIG. 9 interlocked.

For reasons discussed further below, stator interlocking-notch 124 is configured to have a geometry that adapts it to receive the stator interlocking-projection 116 upon an adjacent back-iron portion 104 so that interlocking-projection 116 nestles or fits snugly within interlocking-notch 124. Furthermore, as illustrated in FIG. 10, interlocking-projection 116 is positioned along first back-iron side edge 108 upon back-iron portion 104A to be in registry with interlocking-notch 124 along second back-iron side edge 110 upon back-iron portion 104B when back-iron portion 104A is placed edge to edge with back-iron portion 104B. In this manner of engaging interlocking-projection 116 on back-iron portion 104A with interlocking-notch 124 on back-iron portion 104B, adjacent back-iron portions 104 can be joined and locked together along side edges 108, 110 so that first side edge 108 tightly abuts second side edge 110 to leave a minimal air gap between side edges 108, 110.

Although stator interlocking-projection 116 is shown in FIGS. 1, 9-13 as having a semi-circular geometry, one skilled in the art will recognize that other shapes or curves are possible that permit sufficient surface contact when stator interlocking-projection 116 nestles within and abuts stator interlocking-notch 124.

Back-iron portion 104 furthermore includes two back-iron apertures 130. Each aperture 130 is positioned to be equally circumferentially spaced apart from each adjacent aperture 130A, 130B regardless of whether that adjacent aperture is located on the same back-iron portion 104B or an abutting back-iron portion 104A as seen in FIG. 10. Apertures 130 penetrate the body of back-iron portion 104 extending from back-iron upper surface 132 to back-iron lower surface 133 in a direction orthogonal to both surfaces. For the preferred embodiment shown in FIGS. 1, 9-13, apertures 130 are placed at 2.5° from side edges 108, 110.

Figure 11:
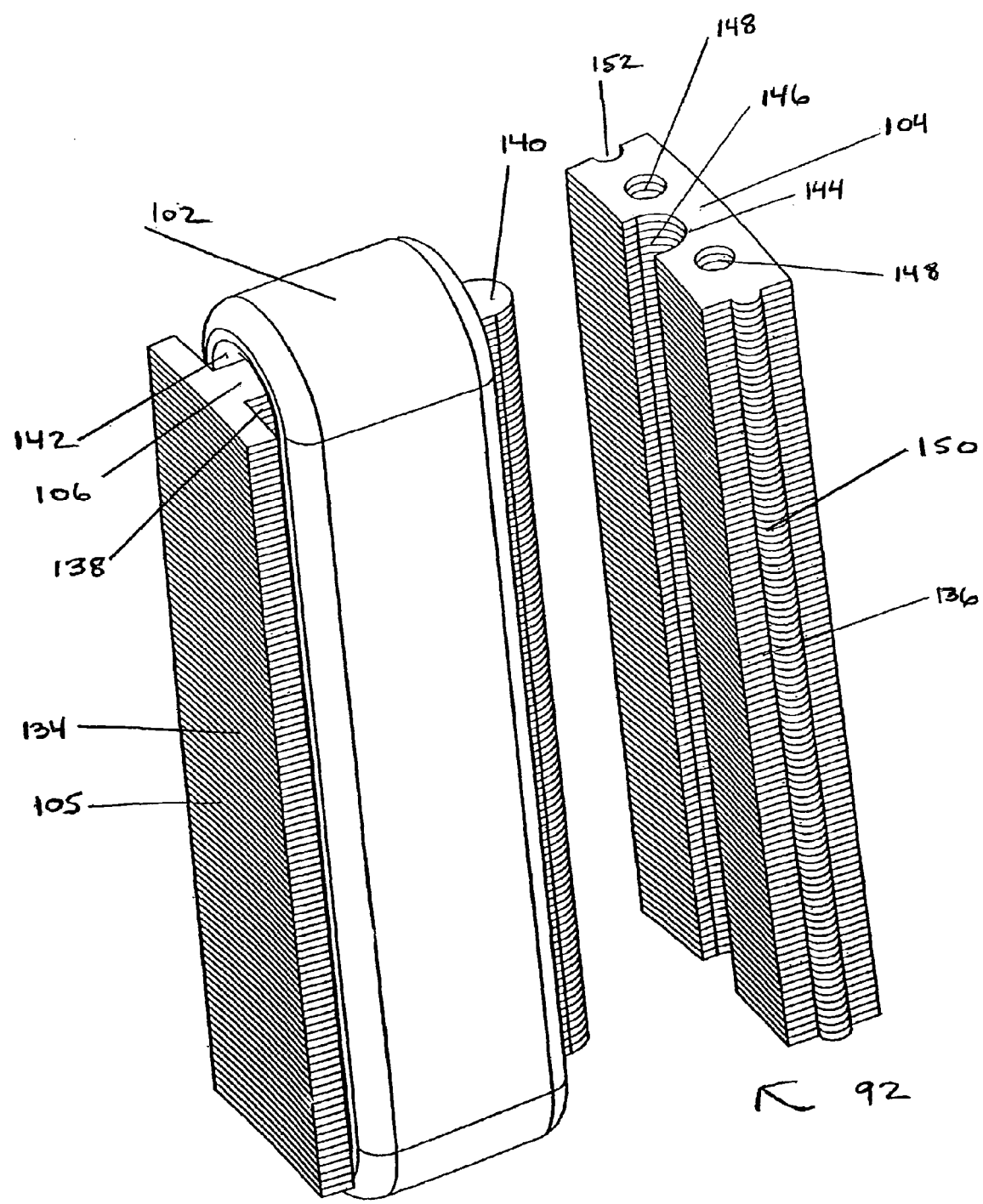
FIG. 11 is an exploded view of a preferred stator pole assembly in accordance with this invention.

Stator stack 98 of each stator pole assembly 92 is formed by first axially aligning a number of center-post portions 106. As illustrated in FIG. 11, this is done by arranging each of the center-post portions 106 into a laminated center-post stack 134 where each portion 106 in the stack is in registry with the others. In a similar manner, an equal number of back-iron portions 104 are independently axially aligned to from a laminated back-iron stack 136.

Center-post stack 134 defines a recessed space bordered by the aligned center-post base sections 105 and stator-wall 138 formed by the aligned center-post arm sections 107. Wire coil 102 is wound separately and surrounded by an insulating outer sleeve to shape wire coil 102 into an elliptical band. Wire coil 102 is sized to fit tightly when mounted or otherwise disposed about stator-wall 138 as shown in FIG. 11. Center-post arm sections 107 and thereby stator-wall 138 extend outward from center-post sections 105 a sufficient length so that center-post distal end 140 of stator-wall 138 entirely protrudes through the interior hole 142 defined by wire coil 102.

Back-iron portion 104 includes back-iron slot 144 recessed within back-iron proximal edge 114. The aligned back-iron slots 144 in back-iron stack 136 define back-iron groove 146 sized to mate or tightly receive center-post distal end 140 of center-post stack 134. Center-post distal end 140 is affixed to back-iron groove 146 to complete the stator pole assembly 92 by mechanical means, a bonding process using either an adhesive or a common electrical impregnation resin, or both methods. Back-iron stack 136 thereby traps wire coil 102 upon stator-wall 138 within stator pole assembly 92.

Back-iron apertures 130 are aligned in back-iron stack 136 and thereby in stator pole assembly 92 to form stator-pole channels 148. Likewise, stator interlocking-projections 116 are aligned to form stator locking-member 150 and stator interlocking-notches 124 are aligned to form stator latching-member 152. Adjacent stator pole assemblies 92 are joined together to form an integral stator ring 154 around the stator perimeter 94 of stator assembly 12 by utilizing the stator locking-member 150 on one stator pole assembly 92 to engage the stator latching-member 152 on another stator pole assembly as illustrated in FIGS. 1, 12, 14-15.

Stator locking-member 150 on each stator pole assembly 92 is configured to nestle tightly within stator latching-member 152 on the adjacent and abutting stator pole assembly 92. For reasons explained above with respect to the geometries of stator interlocking-projection 116 and stator interlocking-notch 124 upon back-iron portion 104, stator locking-member 150 and stator latching-member 152 provide a good mechanical fit between stator pole assemblies 92, connecting the magnetic flux pathway to ensure good magnetic flux transmission in the plane of rotation between adjoining assemblies 92 at their abutting edges. Like a mason's key stone, stator locking-member 150 and stator latching-member 152 act together when assembled to prevent motion by stator pole assemblies 92 within stator ring 154 from undesired tangential and radial motion.

In addition to being utilized to comprise back-iron stacks 136 of the stator pole assemblies 92, back-iron portions 104 are also axially aligned to form laminated stator extension-stacks 156 as illustrated in FIG. 12. As with back-iron stacks 136, the apertures 130 of the back-iron portions 104 in each stator extension-stack 156 are in registry to define stator extension-stack channels 157 sized to frictionally receive fastening rods 74.

In the same manner as stator pole assemblies 92, adjacent stator extension-stacks 156 can be attached to each other by engaging the stator locking-member 150 on one stator extension-stack 156 to the stator latching-member 152 on the other. Stator extension-stacks 156 are joined together to form an integral first stator end-extension 158 axially above and ringing around the top of the back-iron stacks 136 in stator ring 154. A second stator end-extension 160 formed of stator extension-stacks 156 is similarly positioned axially below and ringing around the back-iron stacks 136 of stator ring 154.

Base plate 26 and cover plate 27 are provided with threaded apertures 162, 163 respectively, adjacent to each structure's outer perimeter. Apertures 162, 163 are circumferentially spaced apart the same distance as back-iron apertures 130 on the back-iron portions 104. In constructing stator assembly 12, fastening rods 74 are preferably first threaded into apertures 162 upon base plate 26 as shown in FIG. 12. Rods 74 are then slidably inserted through each of the two stator extension-stack channels 157 on each stator extension-stack 156. The stator extension-stacks 156 so assembled to base plate 26 are mechanically joined to form second stator end-extension 160 as described above. One reason for the axial depth that is selected for each of the stator extension-stacks 156 comprising second stator end-extension 160 is to provide stator ring 154 adequate clearance above base plate 26.

After second stator end-extension 160 is in position abutting base plate 26, stator pole assemblies 92 are mounted upon fastening rods 74 by slidably inserting two rods 74 through each of the two stator-pole channels 148 upon each assembly 92. As seen in FIGS. 1, 12, 14-15, however, stator pole assemblies 92 are positioned to be axially staggered relative to the stator extension-stacks 156 beneath them. In this manner, each stator pole assembly 92 shares at least one fastening rod 74 with each of its abutting stator extension-stacks 156. As each stator pole assembly 92 is added in the construction of stator assembly 12, it is mechanically engaged to any adjacent stator pole assemblies 92 by utilizing stator locking-members 150 and stator latching-members 152 to complete stator ring 154.

First stator end-extension 158 is then positioned above the back-iron stacks 136 on stator ring 154. Once again, however, each stator extension-stack 156 is slid over a pair of fastening rods 74 such that it straddles a pair of adjacent stator pole assemblies 92 as seen in FIGS. 1, 12-15. As each stator extension-stack 156 is added, it is interlocked to any adjacent extension-stacks 156 to form first stator end-extension 158. Among other reasons, the axial depth of first stator end-extension 158 is selected to be sufficient to provide clearance above the end turns of the wire coils 102 in stator ring 154.

First and second stator end-extensions 158, 160 perform as structural tie-straps across the top and bottom of stator ring 154. Stator end-extensions 158, 160, fastening rods 74 and the interlocking of stator pole assemblies 92 provide radial and axial support of stator ring 154 without the need for a conventional external frame. Additional supporting structures for fastening rods 74 can be introduced at points along their axial length in order to provide further mechanical support whenever longer rods 74 are required for an axially longer permanent magnet apparatus 10. Moreover, such additional support can take the form of additional stator end-extensions that are staggered or offset from the stator end-extension above or below them.

Radial inward and outward forces arise as the rotor pole assemblies 20 with their permanent magnets 32 pass each stator pole assembly 92. The forces that act on the stator pole assemblies 92 to twist them include the magnetic forces arising from magnets 32 moving over the face of each stator pole assembly 92 from one edge, to full engagement, and then to the other edge. This twisting motion is resisted by not only the pair of fastening rods 74 upon which each stator pole assembly 92 is mounted, but also by the strength of the stator ring 154 itself and the stator extension-stacks 156 bracing the stator pole assemblies 92 with the shared support of an additional two fastening rods 74.

With completion of stator assembly 12, rotor assembly 14 can be inserted into stator cavity 96 and mounted onto shaft 18. The assembly of permanent magnet apparatus 10 is finished by enclosing the stator and rotor assemblies 12, 14 with cover plate 27. Cover plate 27 is attached by threading the upper ends of the fastening rods 74 secured to base plate 26 through apertures 163, abutting cover plate 27 against the top of first stator end-extension 158. Cover plate 27 is kept tight against stator assembly 12 by securing cover plate 27 to first end-extension 158 with fasteners 76 that are advanced along each rod 74 to the cover plate's upper surface. An opening 164 in cover plate 27 allows for the passing of electrical connections (not shown).

Permanent magnet apparatus 10, as illustrated by FIGS. 1, 12, 14-15, offers the construction of a permanent magnet alternator 165 where torque is transferred from an external power source (not shown) through shaft 18 to rotor assembly 14 for purposes of inducing electrical currents in wire coils 102 of stator pole assemblies 92. Alternatively, permanent magnet apparatus 10 can be constructed as a permanent magnet electric motor where torque is transferred from rotor assembly 14 to shaft 18 by rotor assembly 14 being magnetically driven when electrical current passes through wire coils 102.

Figure 16:
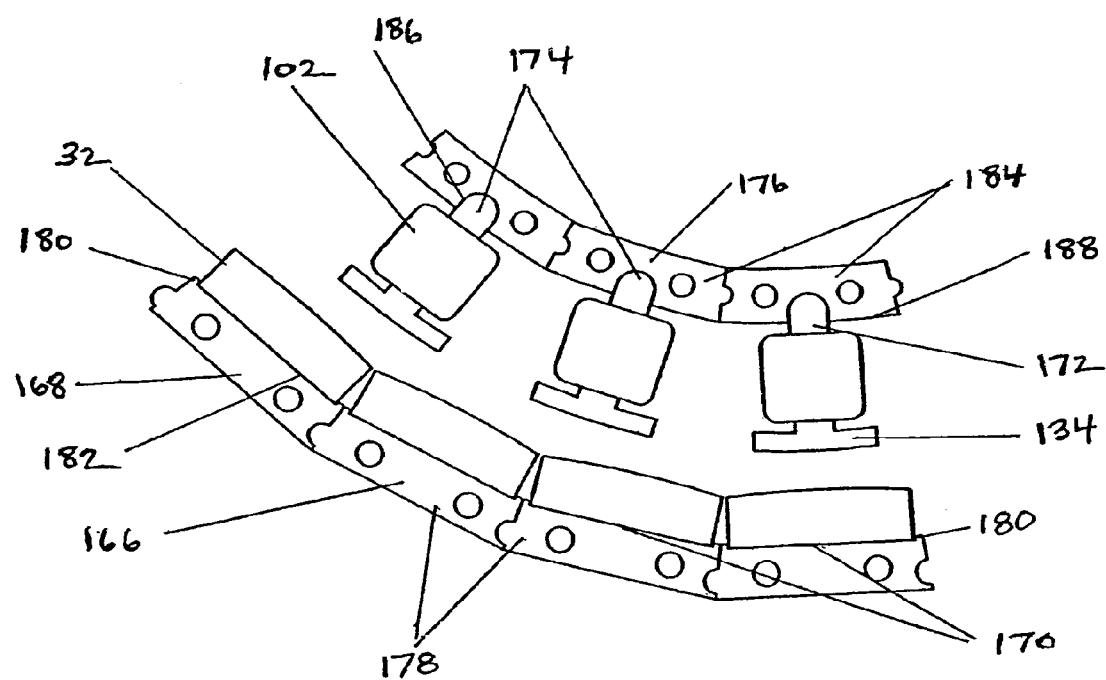
FIG. 16 is a fragmentary top view of another preferred rotor and stator rings for another preferred permanent magnet apparatus in accordance with this invention where the rotor assembly rotates distal to the stator assembly.

Another preferred embodiment of permanent magnet apparatus 10 in accordance with this invention is illustrated in a fragmentary top view in FIG. 16. Permanent magnet apparatus 10 is equally effective where rotor assembly 166 is an external or distal rotor configuration, rather than an internal or proximal one as seen in FIG. 1. In this embodiment, rotor stack 168 is distal and not proximal to permanent magnet 32 on each rotor pole assembly 170. Furthermore, stator assembly 172 is proximal rather than distal to rotor assembly 166. Each stator pole assembly 174 has center-post stack 134 distal to back-iron stack 176. This embodiment still utilizes the same center-post portions 106, magnets 32 and wire coils 102 as the embodiment in FIG. 1. Rotor segments 178 require a minor modification to position rotor tabs 180 on its proximal edge 182. Likewise, back-iron portions 184 are modified to simply position back-iron slot 186 on its distal edge 188.

Those skilled in the art will immediately appreciate how the present invention enables a permanent magnet apparatus, especially direct-drive alternators expected to operate at shaft speeds lower than 300 rpm, to be constructed without the need for frames and without the need for a rotor comprising either a solid cylindrical band of magnetic steel or a laminated stack of unitary circular plates the width of the rotor assembly. The apparatus uses assemblies of segmented laminations to simplify the construction of the stator and rotor assemblies and to provide less costly means of repair and replacement while also reducing the cost of materials and tooling used in that construction. The present invention is especially effective where, as a permanent magnet alternator, torque is being transferred from a wind turbine at operational speeds below 220 rpm and useful torque is achieved beginning at 10 rpm.

Although the invention have been shown and described in conjunction with specific embodiments thereof, it is to be understood that many alternatives, modifications and variations will be apparent to those skilled in the art. Accordingly, it is intended to embrace all such alternatives, modifications and variations that fall within the spirit and broad scope of the appended claims.

The invention claimed is:

1. A permanent magnet apparatus comprising:
 a cylindrical stator assembly having a central axis and a plurality of stator pole assemblies positioned along a stator perimeter of the stator assembly, each stator pole assembly being provided with a wire coil and a laminated stack of a plurality of substantially axially aligned stator segments, each stator segment comprising a center-post portion detachably engaged with respect to a back-iron portion, the wire coil being disposed about a stator-wall defined by the center-post portions; and
 a cylindrical rotor assembly coaxial along the central axis with the stator assembly and adapted to freely rotate with respect to the stator assembly, the rotor assembly having a plurality of rotor pole assemblies spaced along a rotor perimeter of the rotor assembly, each rotor pole assembly being provided with a laminated stack of a plurality of substantially axially aligned rotor segments and a permanent magnet secured thereto,
 wherein the rotor pole assemblies are positioned to move in proximity to the stator pole assemblies to achieve electrical performance by the apparatus.

2. The apparatus of claim 1 wherein stator assembly further includes a base plate having a plurality of fastening rods mounted thereon, the fastening rods extending outward and orthogonal to the base plate, and each back-iron portion is provided with at least one aperture such that each stator pole assembly defines a channel for snugly receiving one fastening rod to secure the stator pole assembly to the base plate.

3. The apparatus of claim 2 wherein the stator assembly further includes least one stator end-extension, each stator end-extension having a plurality of laminated stator extension-stacks positioned along the perimeter of the stator assembly, and each stator extension-stack comprising a plurality of substantially axially aligned back-iron portions and axially abutting at least two stator pole assemblies.

4. The apparatus of claim 3 wherein a first stator end-extension is positioned above the stator pole assemblies and a second stator end-extension is positioned beneath the stator pole assemblies.

5. The apparatus of claim 3 wherein each stator extension-stack defines a channel for snugly receiving one fastening rod to secure the stator end-extension to the base plate.

6. The apparatus of claim 2 wherein the rotor assembly further includes at least one rotor plate having a plurality of fastening rods mounted thereon, the fastening rods extending outward and orthogonal to the rotor plate, and each rotor segment is provided with at least one aperture such that each rotor pole assembly defines a channel for receiving one fastening rod to secure the rotor pole assembly to the rotor plate.

7. The apparatus of claim 6 wherein the rotor assembly further includes at least first and second rotor end-extensions, each rotor end-extension having a plurality of laminated rotor extension-stacks positioned along the perimeter of the rotor assembly, each rotor extension-stack comprising a plurality of substantially axially aligned rotor segments, abutting at least two rotor pole assemblies and defining a channel for receiving one fastening rod to secure the corresponding rotor end-extension to the rotor plate, the first rotor end-extension being positioned above the rotor pole assemblies and the second rotor end-extension being positioned beneath the rotor pole assemblies.

8. The apparatus of claim 7 wherein each rotor segment includes a distal edge extending between first and second rotor-segment side edges and first and second coplanar rotor tabs extending outward from the distal edge adjacent to the first and second rotor-segment side edges respectively, whereby the axially aligned first and second rotor tabs along each rotor extension-stack and along each rotor pole assembly define first and second magnet retention-stops respectively upon each rotor extension-stack and each rotor pole assembly.

9. The apparatus of claim 8 wherein the permanent magnet is sized to be frictionally supported on at least two sides by magnet retention-stops.

10. The apparatus of claim 1 wherein each back-iron portion includes first and second back-iron side edges, the first back-iron side edge having a coplanar stator interlocking-projection extending outward therefrom and the second back-iron side edge having a stator interlocking-notch adapted to snugly receive the stator interlocking-projection such that the axially aligned stator interlocking-projections along each stator pole assembly define a stator locking-member and the axially aligned stator interlocking-notches along each stator pole assembly define a stator latching-member whereby the stator locking-member on a first stator pole assembly of the plurality is inserted into the stator latching-member on a second stator pole assembly of the plurality to mechanically join the first stator pole assembly to the second stator pole assembly.

11. The apparatus of claim 10 wherein the first back-iron side edge defines a first back-iron radial line and the second back-iron side edge defines a second back-iron radial line, the first and second back-iron radial lines intersecting to define a back-iron angle, whereby the back-iron angle is selected to allow the plurality of stator pole assemblies to be joined to form an integral and substantially circular ring such that the stator pole assemblies are tangentially and radially secured together without radial support distal to the stator pole assemblies.

12. The apparatus of claim 1 wherein each rotor segment includes first and second rotor-segment side edges, the first rotor-segment side edge having a coplanar rotor interlocking-projection extending outward therefrom and the second rotor-segment side edge having a rotor interlocking-notch adapted to snugly receive the rotor interlocking-projection such that the axially aligned rotor interlocking-projections along each rotor pole assembly define a rotor locking-member and the axially aligned rotor interlocking-notches along each rotor pole assembly define a rotor latching-member whereby the rotor locking-member on a first rotor pole assembly of the plurality is inserted into the rotor latching-member on a second rotor pole assembly of the plurality to mechanically join the first rotor pole assembly to the second rotor pole assembly.

13. The apparatus of claim 12 wherein the first rotor-segment side edge defines a first rotor-segment radial line and the second rotor-segment side edge defines a second rotor-segment radial line, the first and second rotor-segment radial lines intersecting to define a rotor-segment angle, whereby the rotor-segment angle is selected to allow the plurality of rotor pole assemblies to be joined to form an integral and substantially circular ring such that the rotor pole assemblies are tangentially and radially secured together without radial support distal to the rotor pole assemblies.

14. The apparatus of claim 1 wherein the stator assembly defines a cavity between the central axis and the plurality of stator pole assemblies, the cavity being sized to receive the rotor assembly such that the stator pole assemblies are radially spaced distal to and in magnetic communication with the rotor pole assemblies.

15. The apparatus of claim 1 wherein the rotor assembly includes a shaft along the central axis, the shaft being in mechanical engagement with respect to the rotor pole assemblies to carry torque to and from the rotor pole assemblies.

16. The apparatus of claim 15 wherein the shaft is adapted to be externally rotated whereby electrical current is induced in the plurality of wire coils to operate the apparatus as a permanent magnet alternator.

17. The apparatus of claim 16 wherein the shaft rotates at a speed less than 300 revolutions per minute.

\* \* \* \* \*